United States Patent
Colando (10) Patent No.: US 7,546,290 B2
(45) Date of Patent: Jun. 9, 2009

(54) SYSTEMS AND METHODS FOR EXTRACTING AND ADAPTING DATA

(76) Inventor: Marc Colando, 14011 Alpine Way NW., Seattle, WA (US) 98177

(*) Notice: Subject to any disclaimer, the term of this patent is extended or adjusted under 35 U.S.C. 154(b) by 264 days.

(21) Appl. No.: 11/201,602

(22) Filed: Aug. 11, 2005

(65) Prior Publication Data

US 2007/0038663 A1 Feb. 15, 2007

(51) Int. Cl.
*G06F 17/30* (2006.01)
(52) U.S. Cl. .............. 707/3; 707/10; 707/102; 707/101
(58) Field of Classification Search ........... None
See application file for complete search history.

(56) References Cited

U.S. PATENT DOCUMENTS

| | | | |
|---|---|---|---|
| 6,199,077 B1 | 3/2001 | Inala et al. | |
| 6,236,991 B1 | 5/2001 | Frauenhofer et al. | |
| 6,317,783 B1 | 11/2001 | Freishtat et al. | |
| 6,405,245 B1 | 6/2002 | Burson et al. | |
| 6,567,850 B1 | 5/2003 | Freishtat et al. | |
| 6,675,350 B1 | 1/2004 | Abrams et al. | |
| 6,871,220 B1 | 3/2005 | Rajan et al. | |
| 2004/0015408 A1* | 1/2004 | Rauen et al. | 705/26 |
| 2006/0015416 A1* | 1/2006 | Hoffman et al. | 705/28 |

OTHER PUBLICATIONS

"WebCollage—Channel Marketing," http://www.webcollage.com/html/solutions/channel_marketing/chan.., as printed on Apr. 11, 2005.

* cited by examiner

Primary Examiner—Cam Y T Truong (57) ABSTRACT

Methods and systems for extracting and adapting data are set forth. According to one embodiment, a method comprising determining a schema for an item, wherein the schema contains one or more elements corresponding to attributes of the item, identifying a first web page containing information about the item, populating the elements of the schema based at least in part on the information about the item; formatting data comprising one or more of the schema elements for display on a second web page, receiving input from a user on the second web page indicating a desired transaction with the item, determining a method schema for the desired transaction, populating the method schema based at least in part on the input on the second web page, and using the method schema to facilitate the transaction on a third web page, wherein the third web page is on a different website than the first web page is disclosed.

7 Claims, 6 Drawing Sheets

SYSTEMS AND METHODS FOR EXTRACTING AND ADAPTING DATA

FIELD OF THE INVENTION

The present invention relates generally to methods of extracting and adapting data and more particularly to methods for rendering data into a universal format useful in a variety of applications.

BACKGROUND OF THE INVENTION

Web developers use a variety of languages, methods and techniques for storing and presenting data on a web page. Because of the variety of ways in which web content is formatted, using data from one web page for an application on another web page, or transferring a transaction completed on one web page to another web page can be difficult. Problems also arise due to changes in programming methods over time. For example, developers wanting to access information from a web site designed several years ago, developed by a different company or by a different group of programmers, may find it difficult to format the data for use in a new programming structure. Differences in data format are compounded by the fact that different terminology can be used describe similar data. For example, the same product being sold on the internet can be described in a variety of ways, as can the attributes of that product. Such differences make automated use of information or transactions associated with the product difficult.

Because of these and other differences, automatically taking data from one source and using it in a new application may be difficult or impossible and can require high levels of computer resources. Additionally, existing method of extracting data typically result in data that is suitable only for the one particular application for which it was extracted and that cannot be widely used in a variety of programs. There is a need then for a method for automatically extracting data from a variety of sources and repackaging it in a universal formation that can be used in a variety of applications and a method for generalizing transactions that can be performed with such data.

One exemplary application for such methods is in establishing an e-commerce retail site for a manufacturer. Oftentimes manufacturers do not offer goods for sale directly from their web site due to contractual restrictions with their retailers or to the high costs of building and maintaining a retail website. One alternative to selling goods directly is to link or "deep link" to a retailer's web site. Deep linking is an attempt to take the customer to a point in the retailer's web site where a user can more readily purchase an item seen on the manufacturer's web site. Linking or deep linking to a retailer's web site is inexpensive, but abandons control of the customer to the retailer. Deep linking also risks a very disconnected and confusing customer experience. Such linking is less convenient for the customer who may be required to repeat some or all of the shopping process on the retailer's web page. This can lead to increased sale abandonment. Additionally, linking or deep linking of a retailer's web site does not allow detailed tracking of buying trends of visitors to the manufacturer's web site.

SUMMARY

One embodiment of the present invention provides a method for determining a schema for an item, wherein the schema contains one or more elements corresponding to attributes of the item, comprising identifying a first web page containing information about the item, populating the elements of the schema based at least in part on the information about the item, configuring data comprising one or more of the schema elements for display on a second web page, receiving input from a user on the second web page indicating a desired transaction with the item, determining a method schema for the desired transaction, populating the method schema based at least in part on the input on the second web page, using the method schema to facilitate the transaction on a third web page, wherein the third web page is on a different website than the second web page.

This illustrative embodiment is mentioned not to limit or define the invention, but to provide one example of an embodiment of the invention to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention provide methods for extracting and using data in a variety of ways. For example, in one embodiment, product information can be extracted from a retailer's web site and presented on a manufacturer's web site. This allows the manufacturer to drive customers to its own web site displaying only the manufacturer's goods. The information displayed on the manufacturer's web site can be extracted from information on the retailer's web site such that the manufacturer displays to a customer all of its goods that are for sale on the retailer's site and allows the customer a chance to select one or more of the those items for purchase from the retailer. This can be particularly useful when a manufacturer has an agreement with a retailer preventing the manufacturer from hosting a competing web site selling goods directly to customers. It also allows for more effective cooperation between manufacturer and retailer to work in concert to facilitate online sales without necessarily having to create custom development across both companies and web sites.

Embodiments of the invention can then facilitate the purchase of the desired item from the retailer. In one embodiment, the transaction can be completed such that the customer never leaves the manufacturer's web page. In this way the transaction appears to the customer the same as if it occurred on the manufacturer's web site, but it is actually processed on the retailer's web site. This prevents any loss of revenue to the retailer, while the manufacturer is able to retain the customer on its site. Additionally, by retaining control over the customer, the manufacturer can prevent exposure to competing advertisements and reduce sale abandonment caused by increased transaction time that could occur with other attempts to transfer the transaction to a retailer.

This exemplary introduction is provided only to assist the reader and should not be read to limit or define all the embodiments of the present invention. Other embodiments and methods are discussed more fully below.

Exemplary System

Figure 1:
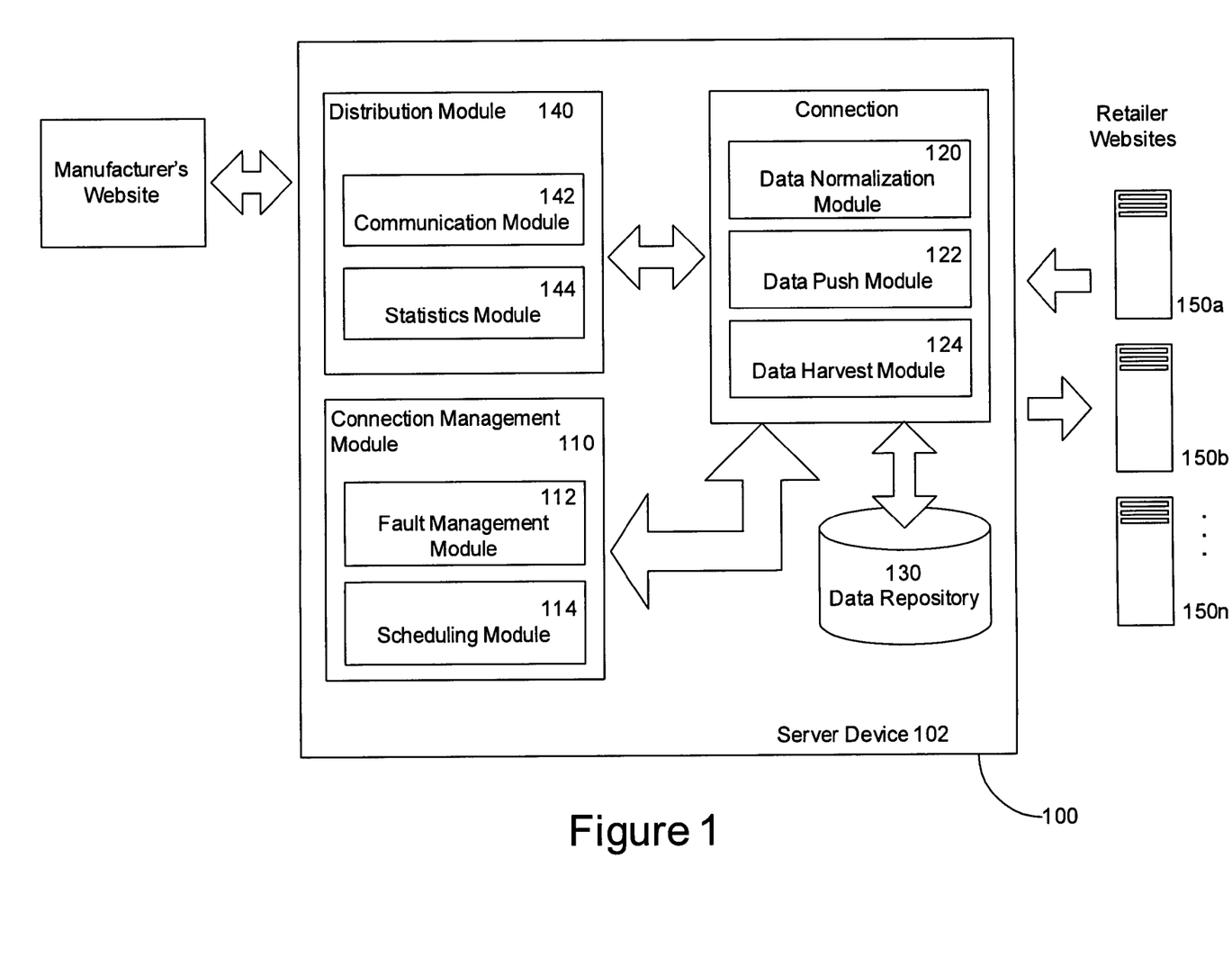
FIG. 1 illustrates an exemplary system in which embodiments of the present invention may operate.

FIG. 1 illustrates an exemplary system 100 in which embodiments of the present invention may be carried out. The exemplary system 100 comprises a server device 102 in communication with web servers 150(a)-(n) and a website 160. Web servers 150(a)-(n) can host retail web sites or other web services providing product information on consumer goods and other products and offering such items for sale over a network such as the Internet. The server device 102 comprises a processor unit capable of executing program code to carry out the methods described herein. The processor is in communication with a computer readable storage medium capable for such program code. The program code can be divided into various components or modules that together accomplish the methods of the present invention and will be discussed in this context herein. For example, in the embodiment shown in FIG. 1, the server device 102 comprises a connection manager module 110, a connector module 120, a data repository 130, and a distribution module 140. In other embodiments, other suitable configurations of software modules can be used to accomplish the disclosed methods.

The connection manager module 110 monitors and controls data acquisition and caching from the web servers 150 (a)-(n), error handling, statistics reporting, and scheduling. The connector module 120 performs the extraction of data from a source, renders the data into a universal format, and adopts methods available on the web servers 150(a)-(n) or the manufacturer's web site 110 into a universal format. To accomplish this, the connector module 120 employs a data normalization component 122, a data harvest component 124 and data push module 126. The connector module 120 is also in communication with a data repository 130 which can be comprised of any suitable data storage medium and employ any one or combination of methods for storing data including arrays, hash tables, lists, and pairs. The distribution module 140 facilitates the presentation and use of the universally formatted data by way of a communication component 142 and monitors usage data by way of statistics component 144. Each of these modules and components is discussed more fully below in connection with the described methods.

Exemplary Methods

Various methods in accordance with the present invention can be carried out. For example, one embodiment comprises determining a schema for an item, wherein the schema contains one or more elements corresponding to attributes of the item, identifying a first web page containing information about the item, populating the elements of the schema based at least in part on the information about the item; formatting data comprising one or more of the schema elements for display on a second web page, receiving input from a user on the second web page indicating a desired transaction with the item, determining a method schema for the desired transaction, populating the method schema based at least in part. on the input on the second web page, and using the method schema to facilitate the transaction on a third web page, wherein the third web page is on a different website than the first web page.

Figure 2:
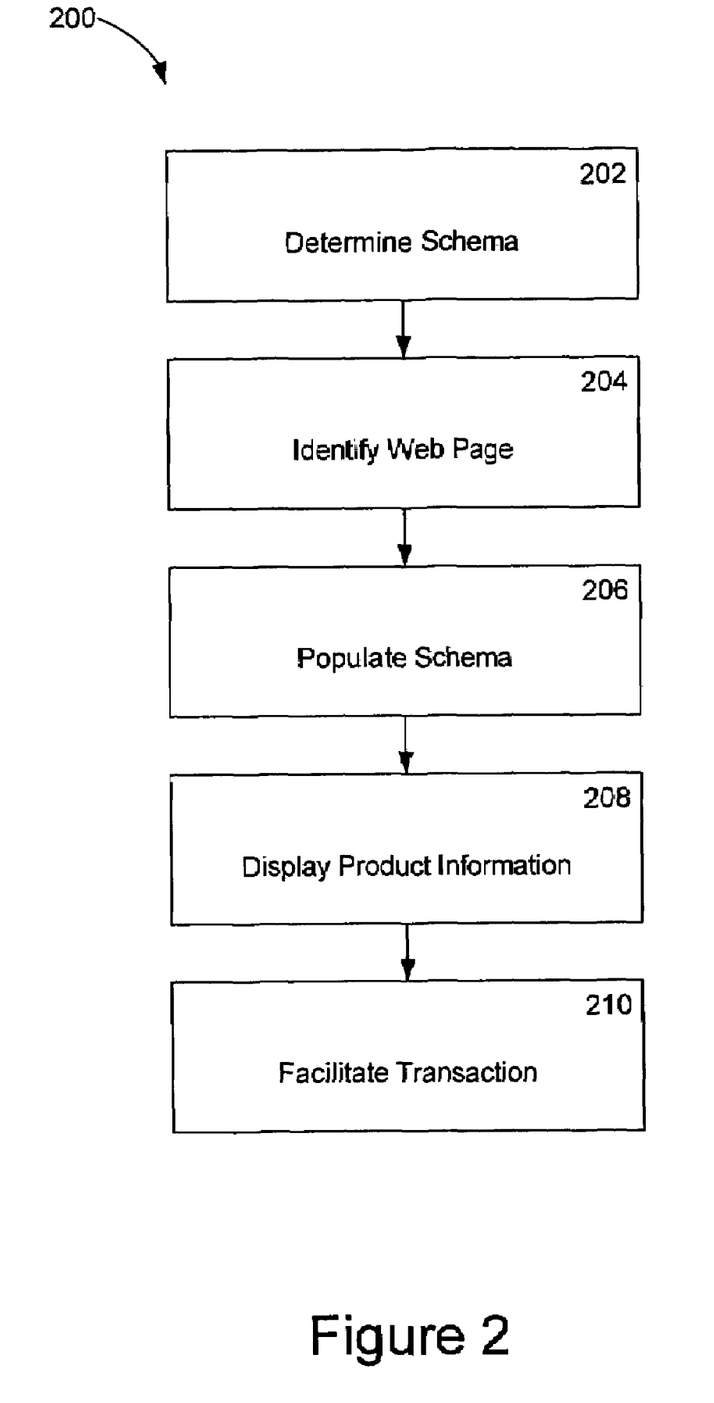
FIG. 2 illustrates an exemplary method according to one embodiment of the present invention.

FIG. 2 illustrates an exemplary method 200 for extracting and normalizing data and presenting it to a user to facilitate a transaction. The exemplary method 200 begins in block 202, wherein the data normalization component 122 determines a schema for a product or item. A schema is a collection of elements identifying aspects or features of an item. For example, a schema for a computer item can include elements such as processor speed, memory, processor type, hard drive capacity, and other characteristics that are interesting or defining features of the computer. Typically, the elements for a particular schema will contain information a buyer of the product would consider relevant, but can also contain additional information to facilitate cross referencing or other transactions. For example, the elements of a book schema can include author, title, summary, price, reviews, and other suitable elements defining relevant properties to a purchaser of the book. The book schema can also contain information that may not be of interest to a consumer, but that can assist with transactions involving the book such as an ISBN number or catalog number.

The data normalization component 122 can determine a schema by identifying and retrieving an existing schema or by creating a new one. For example, the normalization component 122 can receive input identifying a desired product about which information is to be gathered and then identifying a corresponding schema from the data repository 130. Alternatively, the normalization component 122 can create a schema in response to input identifying elements of a particular product that will comprise the schema.

The schema for a type of item allows a universal object for all items of that type to be established. For example, a book schema can contain elements corresponding to the relevant information potentially available about any given book. The schema can thus take varied information from different sources in differing formats or layouts and sort it into clearly defined elements. In this way unorganized data about various items are converted into a format readily understood and manipulated by automated processes or computer programs.

Figure 3:
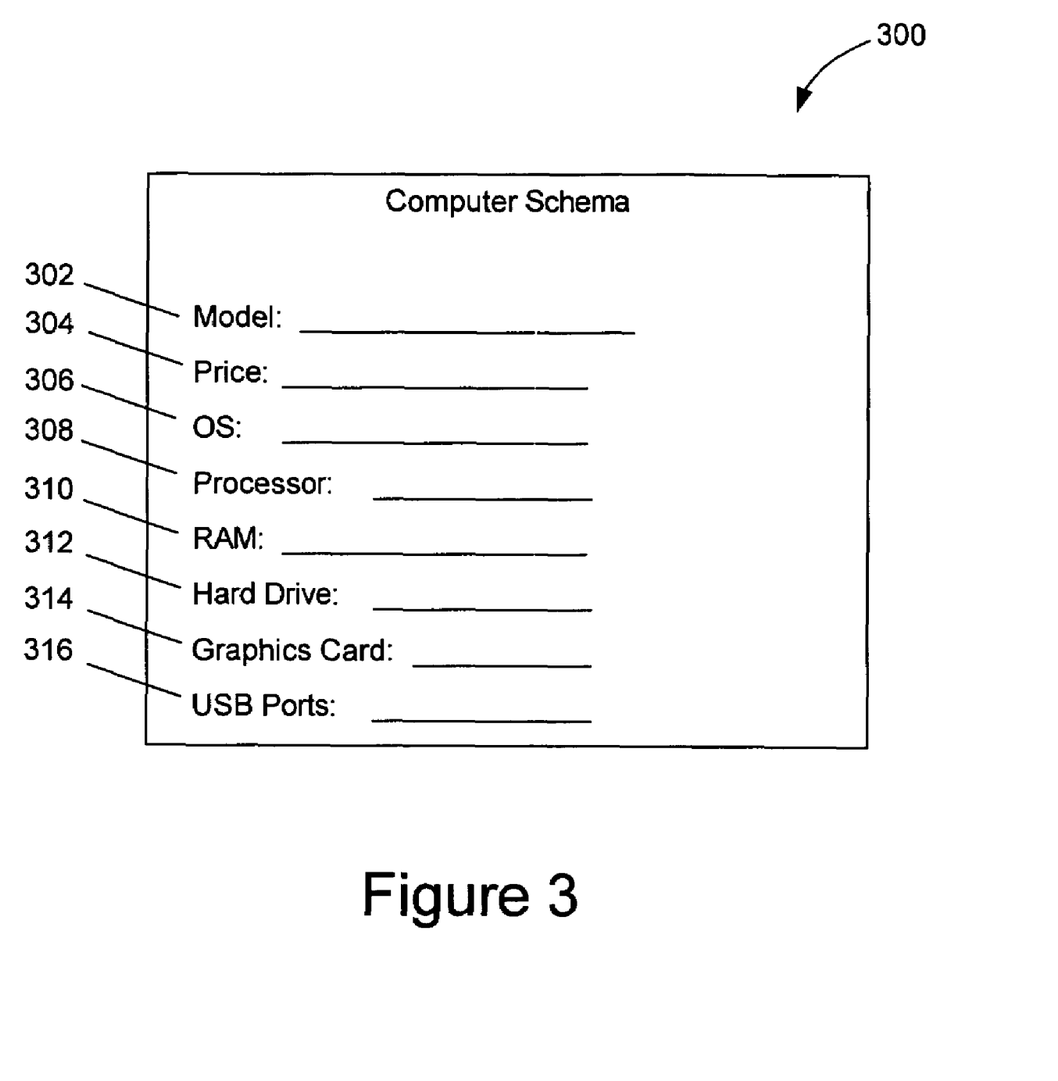
FIG. 3 illustrates an exemplary schema according to one embodiment of the present invention.

FIG. 3 illustrates an exemplary schema 300. The exemplary schema 300 represents a schema for a computer item and contains exemplary elements 302-314. The exemplary elements 302-314 show in FIG. 3 include model information element 302, price information 304, operating system information element 306, processor information element 308, memory information element 310, storage information element 312, video card information element 314, and port information element 316. In other embodiments, other suitable schema elements could be included in the computer schema 300. For example, according to one embodiment, the schema 300 can contain product image elements, graphics elements, logo or icon elements, and other visual or multi-media elements.

Figure 4:
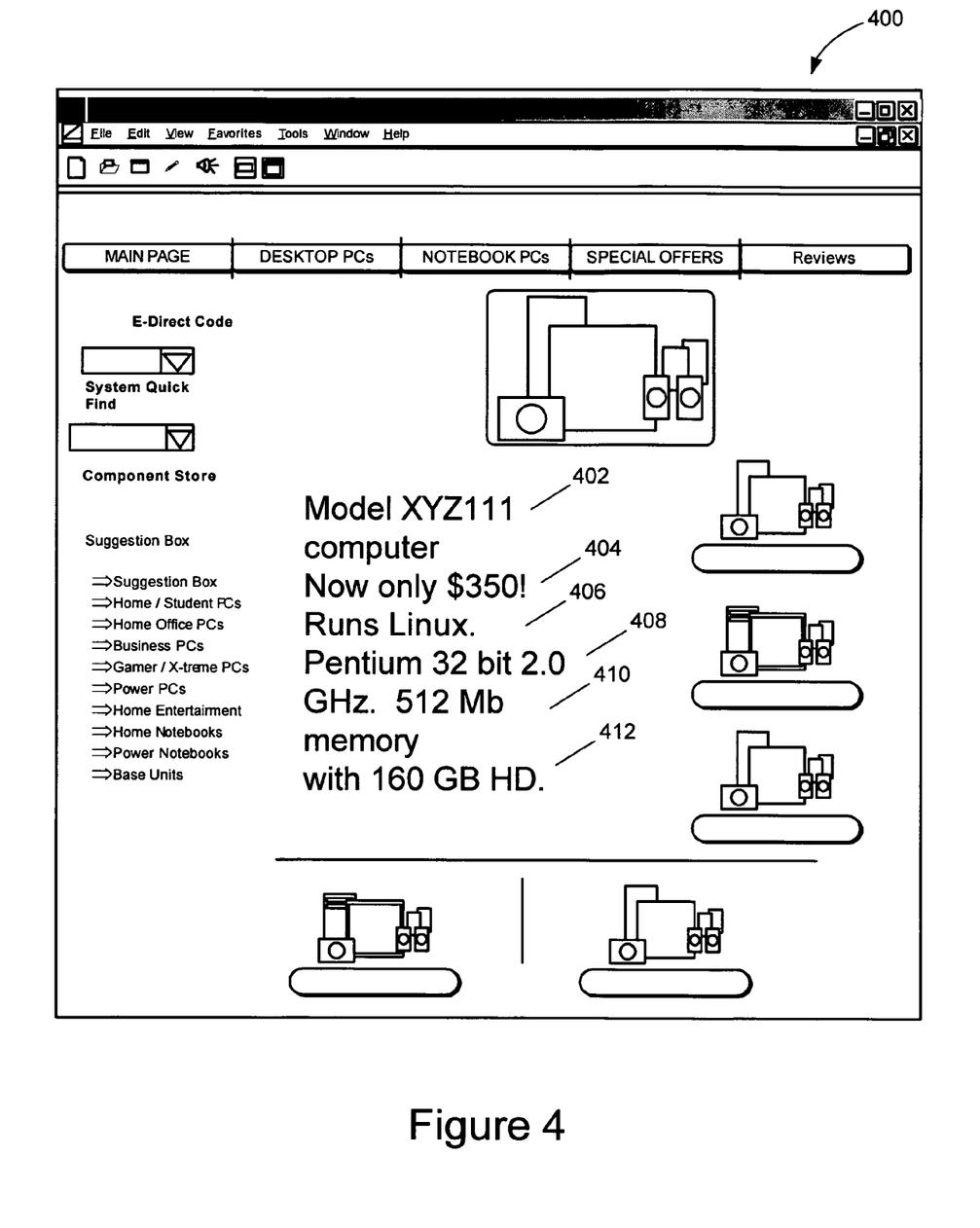
FIG. 4 illustrates an exemplary web page from which information may be extracted according to one embodiment of the present invention.

After a schema is determined by the data normalization module 122, the method 200 proceeds to block 204, wherein the data harvest module 124 identifies a first web page containing data relevant to the product for which the schema was determined in block 202. For example, for the computer schema 300, the data harvest module 124 can identify a web page 400 as illustrated in FIG. 4, which contains information about a computer being offered for sale on a retailer's web site. Identifying a web page containing relevant product information can be accomplished in a number of ways. In one embodiment, a user can manually identify a web page or web site containing information relevant to the product. According to another embodiment, the data harvest module 124 can crawl one or more web pages and identify information relevant to the product. In a preferred embodiment, an intelligent crawling method is utilized by the data harvest module 124 to more efficiently search for product information.

An intelligent crawling method identifies from a large set of web pages, such as an entire web site, a subset of pages likely to contain usefull information. This can be accomplished by first executing a search of the large set of documents. Executing the search can be done automatically when crawling a site by identifying a transaction point for entering search criteria for documents within a web page, such as a search box, and then executing a search for the product.

For example, if the data harvest module 124 is crawling a computer store's web site, it can first identify a search field displayed on the web site designed to search documents within that web site. The data harvest module 124 can then cause a search to be executed for the type of computer product it is collecting data for. In response to the search, the data harvest module 124 can then receive a subset of documents from the web page which are more likely to contain information for the product. According to other embodiments, external search applications or programs can be used manually or automatically by the data harvest module 124 to identify a relevant subset of documents. By intelligently identifying a relevant subset of documents, the data harvest module 124 can more efficiently identify product information and conserve computer resources by not crawling irrelevant pages.

Figure 5:
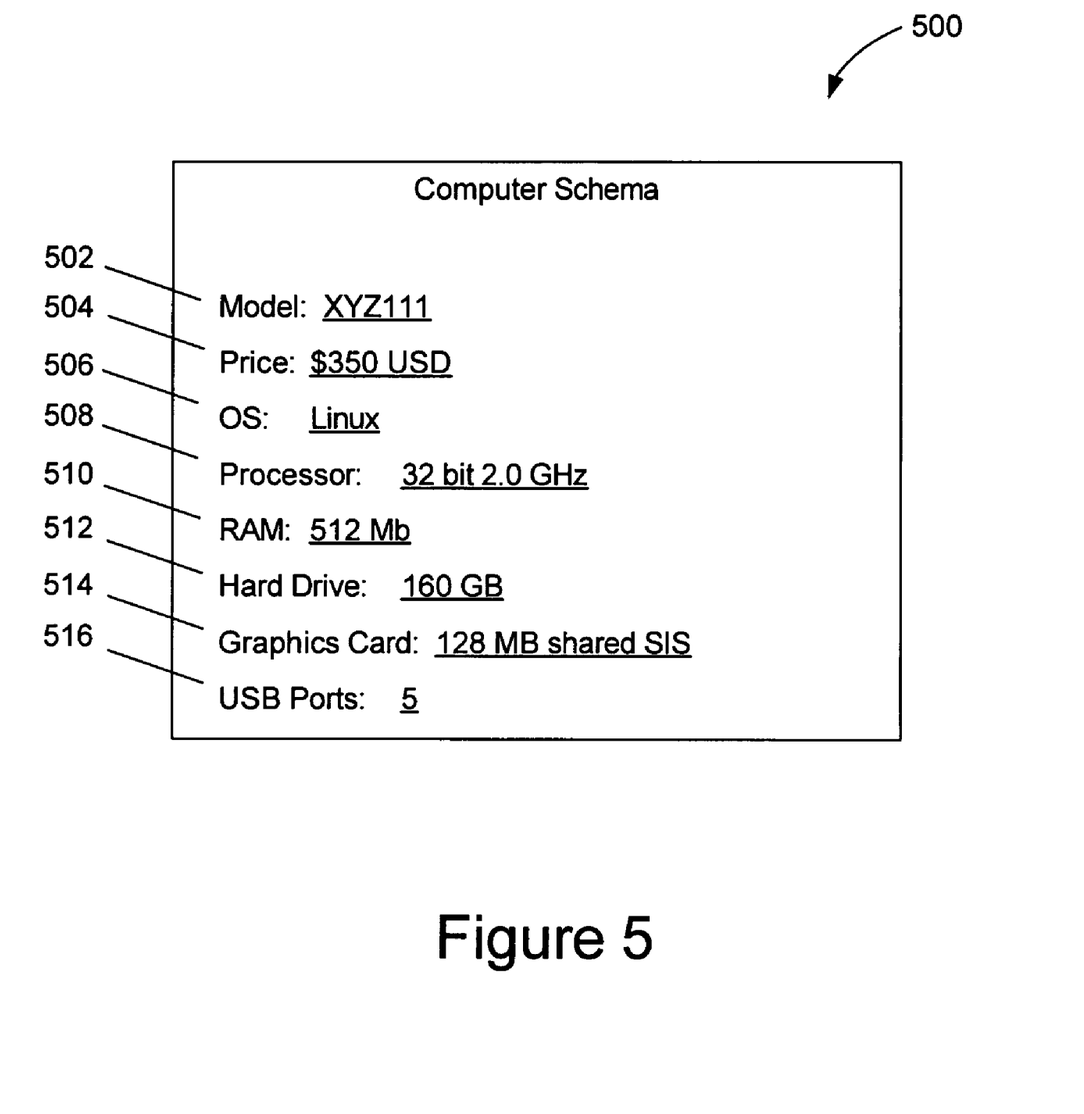
FIG. 5 illustrates the exemplary schema of FIG. 3, populated with information extracted according to one embodiment of the present invention.

Once the data harvest module 124 identifies a web page containing data relevant to the product, the method 200 proceeds to block 206, wherein the data harvest module 124 populates the data schema 300 with product data—as shown in FIG. 5. To populate the data schema 300 with product data, the data harvest module 124 identifies values for the schema elements from the data on the relevant web page. For example, the data harvest module 124 can populate the elements 302-314 of the computer schema 300 by extracting information from the web page 400 including model information 402, price information 404, operating system information 406, processor information 408, memory information 410, storage information 412, video card information 414, and port information 416.

In order to identify that the model information 402, price information 404, operating system information 406, processor information 408, memory information 410, storage information 412, video card information 414, and port information 414 correspond to schema elements 302-314 respectively, the data harvest module 124 can access a dictionary containing possible values for schema elements and triggering or identifier characters that indicate likely schema element values.

A dictionary of possible values for schema elements identifies words, characters, ranges of values, or other suitable indications of possible schema values. For example, a dictionary for a computer schema can identify suitable words for possible operating system that a given computer might use. These could include, for example, Linux, Unix, Solaris, Mac OS, OS 2, Windows XP, Windows 2000, and so forth. By accessing a dictionary listing the possible universe of suitable values for a given element, the data harvest module 124 can more readily identify values for a schema element from a web page.

Triggering or identifier characters are symbols, words, phrases, or other pieces of information that can be used to signify a high likelihood that data associated with the identifier corresponds to a particular schema element. For example, trademarked names appearing within a web page can reliably be used to identify that related information corresponds to a particular type of product. For example, a trademarked name for a computer processor appearing on web page 400 can be used to identify that the associated information 406 is information about a computer processor. Because the trademarked name is unique, more likely to be spelled correctly, and consistently used in connection with a known type of product, it can reliably be used to determine that the associated information indeed relates to that type of product—here a computer processor, for example.

The data harvest module 124 can also access the dictionary to identify a type or range of values for various schema elements in order to determine which data values belong to which elements. For example, the dictionary can indicate that for a computer processor, a frequency rating will always be listed as cycles per second such as in megahertz or gigahertz. Similarly, suitable values for storage capacity will be listed in bytes and typically be on the order of megabytes, gigabytes, or terabytes. In this way, the data harvest module 124 can distinguish hard drive storage capacity from processor speed even if the values are not clearly marked or delineated from other pieces of information.

Other examples of possible identifying or triggering words include symbols or unique data formats. For example, currency symbols or formatting patterns with two digits following a decimal point can be used to signal pricing information.

In addition to populating the schema 300 with information extracted from the web page 400, the data harvest module 124 can access additional information sources to populate elements of the schema 300 for which information is not available on the web page 400. For example, the data harvest module 124 can identify the model information 402, processor information 406, and manufacturer information 406 from the web page 400. The web page 400 does not list information for all of the elements of schema 300 however. For example, additional information about the processor's front side bus, chipset, and socket may not be presented on the web page 400. Based on the information that is obtained for the schema 300, the data harvest module 124 can search other network sources for additional information about the same processor. For example, a web page hosted by the manufacturer of the processor may included the additional missing information for schema elements 310-316.

Figure 6:
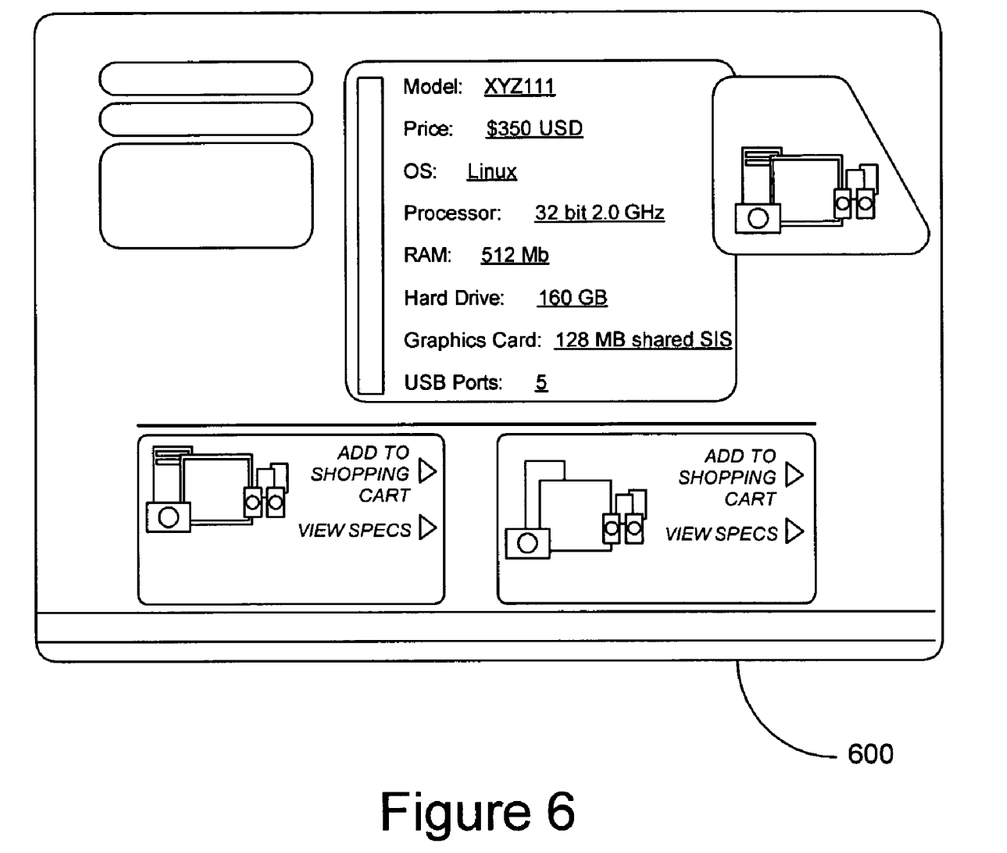
FIG. 6 illustrates an exemplary web page presenting the information contained in the schema of FIG. 5.

Once the data module 124 populates the schema, the method 200 proceeds to block 208 wherein the product information within the schema is presented on a second web page. The product information can be presented on the second web page in a more user-friendly format as illustrated in FIG. 6. FIG. 6 shows a manufacturer's web 600 page displaying the product information extracted from the retailer web page 400.

Once the product information from the schema 300 is presented on the web page 600, the methods 200 proceeds to block 210, wherein a transaction involving the product is facilitated by the data push module 122. The data push module 122 facilitates the transaction by receiving input from a user accessing the web page 600 indicating the type of desired transaction. For example, the user can indicate a desire to purchase a product displayed on the web site 600. Once the data push module identifies the type of transaction desired, it identifies a corresponding method schema. The method schema is similar to the schemas discussed above that contain elements describing attributes of an item, but is specifically designed to contain elements corresponding to the relevant attributes of a transaction. For example, a credit card purchase schema can contain elements such as credit card number, name, address, shipping address, and so forth, that would describe the needed information for a credit card purchase transaction.

Identifying the corresponding method schema can be accomplished by accessing the correct schema from the data repository 130. Method schemas are created by the data harvest module 124 in a manner similar to the creation of the item schemas. For example, the data harvest module 124 can identify a variety of similar methods, such as different types of "add-to-cart" methods employed by various e-commerce retailers, and generalize from those methods the basic elements that are needed for an add-to-cart method schema. This schema can then be used to facilitate any add-to-cart method without the need to specifically configure the transaction specifically for a particular retailer.

In one embodiment, one or more item schemas extracted from a first web site can be provided to a web developer to facilitate the creation of a new web page displaying information extracted from the first web site. For example, items schemas from computer items extracted from a retailer's web site can be provided to a computer manufacturer. The computer manufacturer can then use the information contained in the item schemas to present its own web site listing information about its products as extracted from the retailer's web site. In this way, the manufacturer can provide up to date information about which of its products a particular retailer is selling. In one embodiment, the present invention then allows the manufacturer to access method schemas for transactions available on the retailer's web site such as the purchase of an item.

The data push module 122 is responsible for receiving input from a user viewing a web page, such as the manufacturer's web, populating a corresponding method schema with the input, and using the information from the method schema to facilitate a transaction on a second web page, such as a retailers web site. For example, for a purchase method, the data push module can reference a purchase schema to identify the information needed for this type of transaction. This can include for example credit card information, shipping information, and an item identification. The data push module 122 can then configure this information into a format that can be received by the second web page where the transaction is to be completed. For example, the data push module 122 can format the purchase information received from the user viewing the manufacturer's site so that it can be received and processed by a purchasing component of a retailer's website.

By facilitating the completion of transactions on the retailer's web site, the manufacturer is not competing with the retailer but is still able to maintain a web presence that will attract customers directly and control their shopping experience. For example, potential customers visiting the retailer's web site directly will be presented with a number of competing goods in addition to the manufacturer's goods. Potential customers going to the manufacturer's site will only see the goods of that manufacturer, which can be displayed in more appealing format than they would otherwise by on the retailer's web site. The information to for display on the manufacturer's web site can be information extracted using the methods described above from the retailer's web site to ensure that only goods that are actually available for purchase are displayed.

It will be seen that one specific advantage offered by embodiments of the present inventions is that a retailer can reap the benefit of a rich, brand specific web experience engineered by a manufacturer without incurring the cost or burden of creating that experience on its own. Likewise, the manufacturer can increase product sales without incurring the costs associated with maintaining a retail and distribution site.

Once the customer decides to make a purchase, the manufacturer can use method schemas for transaction options presented by the retailer to present those same options to the customer. For example, the manufacturer can offer to load a shopping cart on the retailer's site and create a session that will allow a simplified check out procedure when the customer is ready to check out, or it can proceed to completely process the transaction on the retailer's site, in such a way that the customer remains in direct connection with the manufacturer's site and not the retailer's site. In this way, the manufacturer controls the entire shopping experience, but does not compete with the retailer for the sale of its product.

It will be appreciated that while the above methods are described using the example of a retailer and a manufacturer, embodiments of the present invention are not limited to this context and can be used by a variety of users. For example, a user can use the methods to reconfigure an existing web site originally designed by that user, but which is outdated or would be time consuming to reconfigure by hand. Embodiments of the present invention can be used to extract the information from the existing site and allow it to be reconfigured for a new site design. Such new designs my be used for, but not limited to, initiatives to update look and feel, messaging, testing all facets of the marketing mix of product, pricing, promotions, messaging, etc.

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. A method for searching web pages, the method comprising:

determining, by utilizing a computer, a schema for an item, wherein the schema contains one or more elements corresponding to attributes of the item, the item is stored in a memory;

identifying a first web page containing information about the item, wherein the identifying the first web page comprises using an intelligent searching method, wherein the intelligent searching method comprises identifying a search field for searching a first set of web pages; and executing a search to identify a relevant subset of web pages likely to contain information about a product;

populating the elements of the schema based at least in part on the information about the item, wherein the populating the elements of the schema comprises accessing a dictionary containing schema element values or identifier characters, wherein the identifier characters comprise a trademark, currency symbol, proper name, brand name, or formatting pattern;

configuring data comprising one or more of the schema elements for display on a second web page;

receiving input from a user on the second web page indicating a desired transaction with the item;

determining a method schema for the desired transaction;

populating the method schema based at least in part on the input on the second web page, using the method schema to facilitate the desired transaction on a third web page, wherein the third web page is on a different website than the second web page.

2. The method of claim 1, wherein the first web page and the third web page are the same.

3. The method of claim 1, wherein the first web page and the third web page are the same.

4. The method of claim 1, wherein the transaction comprises purchasing the item.

5. The method of claim 1, further comprising populating the schema with additional information not included on the first web page.

6. The method of claim 1, wherein facilitating the transaction on the third web page comprises one or more of creating a session on the third web page and placing items in a shopping cart associated with the third web page.

7. The method of claim 1, wherein the transaction is completed while the user remains in direct communication only with the second web page.

* * * * *